June 21, 1966 L. J. BINTZ ETAL 3,256,871
INTERNAL COMBUSTION ENGINE SYSTEM FOR DIVERTING CRANKCASE
BLOWBY GASES TO INTAKE MANIFOLD
Filed Aug. 3, 1964 3 Sheets-Sheet 1
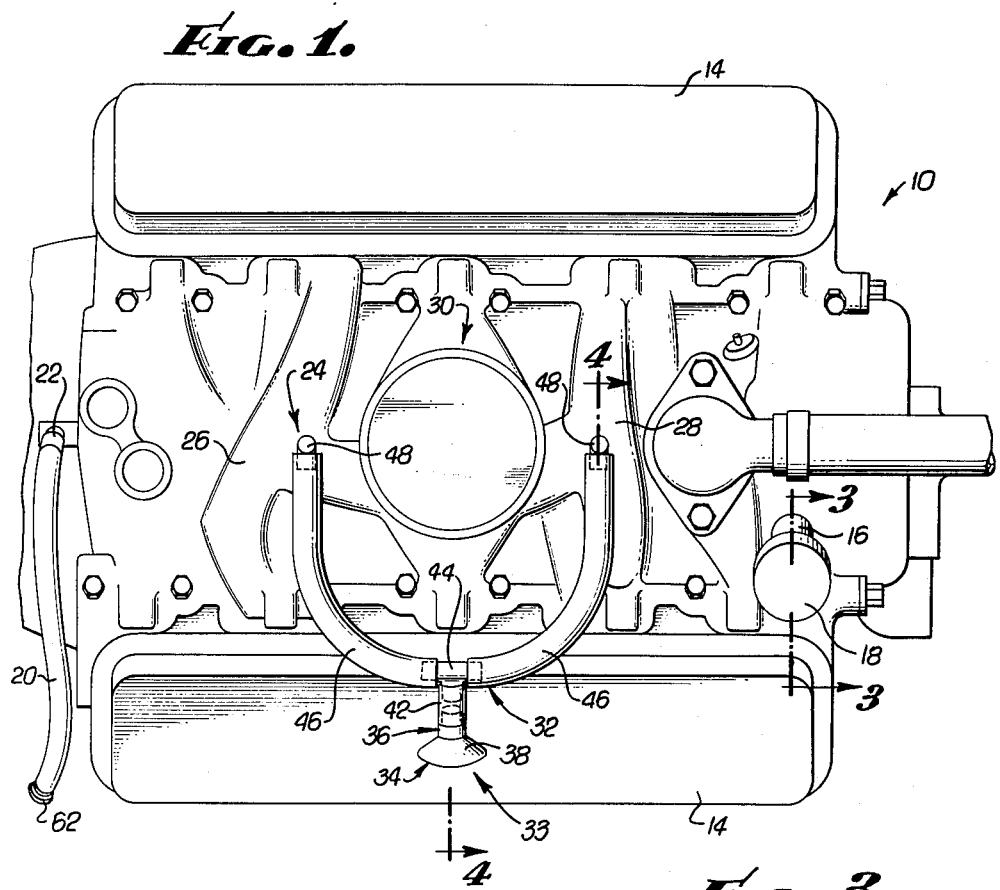
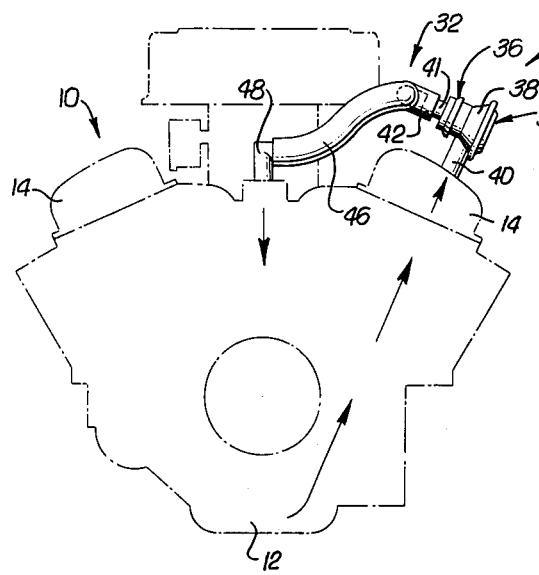
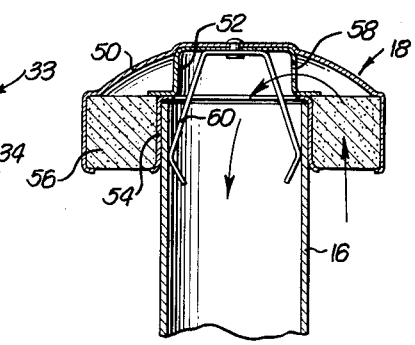
LOUIS J. BINTZ
KENNETH E. RAWALD
INVENTORS.
BY
*Huebner & Worrel*
ATTORNEYS.

June 21, 1966
L. J. BINTZ ETAL
3,256,871
INTERNAL COMBUSTION ENGINE SYSTEM FOR DIVERTING CRANKCASE
BLOWBY GASES TO INTAKE MANIFOLD
Filed Aug. 3, 1964
3 Sheets-Sheet 2
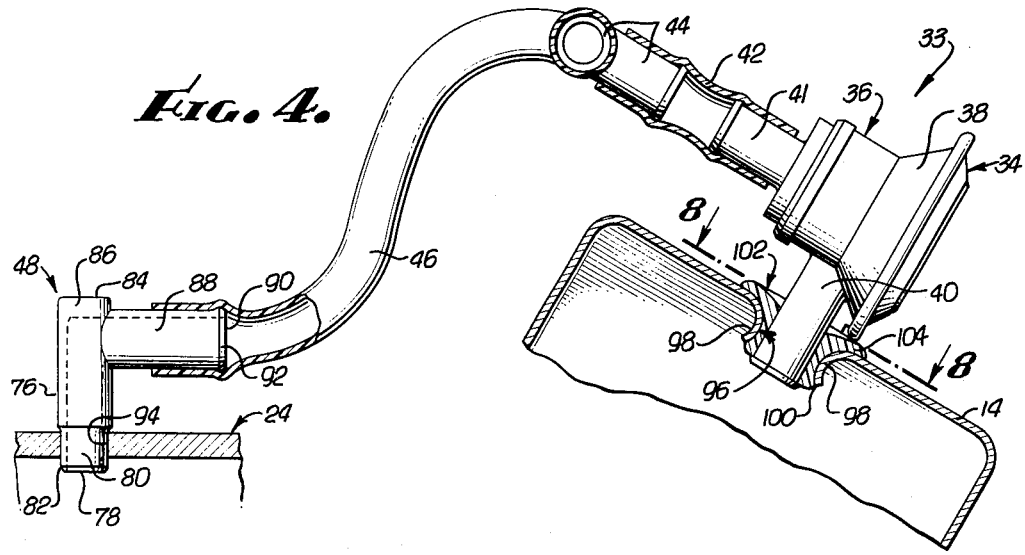
FIG. 4.
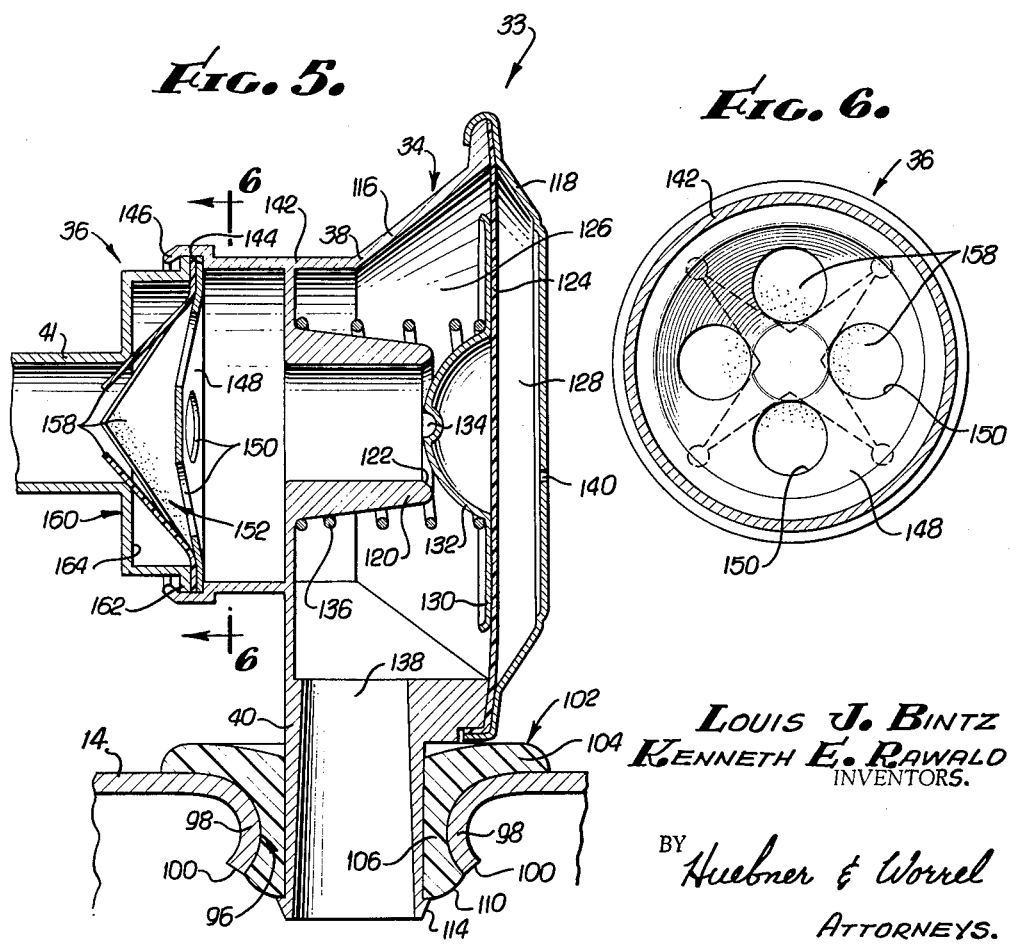
FIG. 5.
FIG. 6.
LOUIS J. BINTZ
KENNETH E. RAWALD
INVENTORS.
BY Huebner & Worrel
ATTORNEYS.

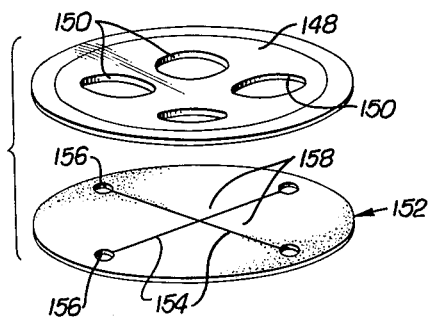
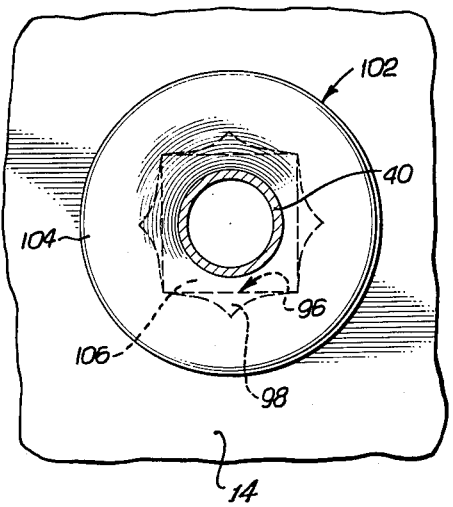
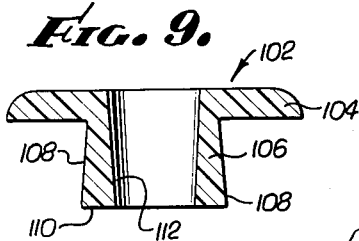
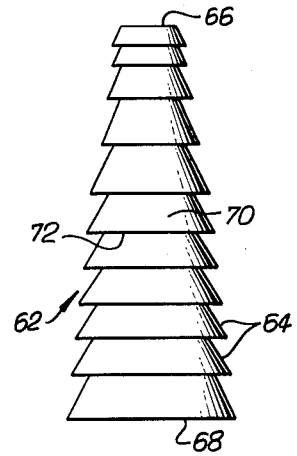
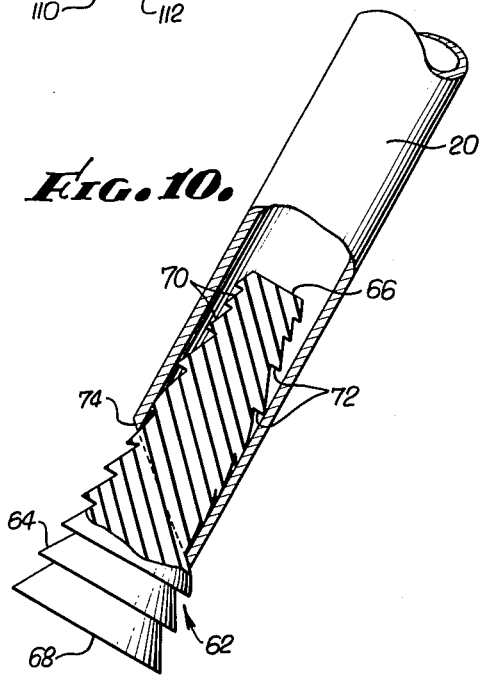

United States Patent Office 3,256,871
Patented June 21, 1966

3,256,871
INTERNAL COMBUSTION ENGINE SYSTEM FOR DIVERTING CRANKCASE BLOWBY GASES TO INTAKE MANIFOLD
Louis J. Bintz, Placentia, and Kenneth E. Rawald, Anaheim, Calif., assignors to Norris-Thermador Corporation, Los Angeles, Calif., a corporation of California
Filed Aug. 3, 1964, Ser. No. 386,841
3 Claims. (Cl. 123—119)

The present invention relates to air pollution control by ventilating blowby gases from internal combustion engine crankcases and returning these blowby gases to the air-fuel intake systems, and it relates particularly to a novel method and apparatus employed in connection with such a crankcase ventilating system for providing improved control over the flow of gases from the crankcase to the engine intake system for various conditions of engine operation, so as to recycle substantially all blowby gases back through the engine without any substantial upsetting of normal carburetor operation under the various conditions of engine operation, and without likelihood of damage to the engine from the application of intake vacuum conditions to the crankcase for withdrawing the blowby gases.

Control of exhaust emissions from automotive internal combustion engines has become a serious problem in urban areas because of large quantities of "smog"-forming and other harmful exhaust gas components, such as unburned or partially burned hydrocarbons and carbon monoxide, which are being dumped into the atmosphere from the engines of automobiles, trucks and buses. These pollutants are discharged into the air through the exhaust system of the engine, and also as gases blown past the pistons in the cylinders and into the crankcase. These contaminant-containing blowby gases are then discharged from the crankcase into the air through the oil fill tube and cap, or other crankcase vent tube such as the road draft tube usually employed with automobile engines. Such blowby gases account for a substantial portion of the air pollutants from internal combustion engines.

Several systems are presently in use for controlling these blowby exhaust gases, the systems usually involving conduit means connecting the crankcase with the intake manifold to utilize the vacuum condition in the intake manifold to draw the blowby exhaust gases out of the crankcase into the vehicle intake system, so that the combustibles in the blowby gases, which are the principal harmful ingredients, will again be subjected to the engine combustion cycle. A typical crankcase ventilating system of this general type will provide the conduit between the valve rocker arm cover, which is accessible at the top of the engine and which communicates with the crankcase, and the intake manifold, which is also readily accessible. Some valve means is normally employed in the ventilating conduit so as to restrict or control the volume of gas flow from the crankcase to the intake manifold, in an attempt to prevent the application of too high a vacuum to the crankcase, while at the same time attempting to prevent the introduction of too much air to the intake system of the engine. If too much vacuum is applied to the crankcase, it is likely to draw dirt in through the crankcase seals, and can damage the seals themselves because of the pressure differential. On the other hand, if too much air is permitted to pass through the ventilating conduit to the engine intake system from the crankcase it is likely to disturb carburetion, at least under some modes of engine operation.

One such internal combustion engine crankcase ventilating system which has been found generally satisfactory is disclosed in copending application Serial No. 321,556, filed November 5, 1963, entitled "Apparatus for Ventilating Internal Combustion Engine Crankcase," which is a joint application of the two applicants in the present application. Improvements in the system of said application Serial No. 321,556 are found in copending application Serial No. 348,217, filed February 28, 1964, entitled "Flame Arrestor for Crankcase Ventilating Apparatus," now Patent No. 3,182,647, which is an application of Louis J. Bintz, one of the applicants herein. Said copending applications employ a flow regulator valve in the conduit from the crankcase to the intake manifold which is responsive both to intake manifold vacuum and to the vacuum or pressure condition within the crankcase so as to meter or modulate the flow of gases from the crankcase to the intake manifold generally in accordance with the amount of the blowby gases which are accumulating in the crankcase under various engine operating conditions. The improvements disclosed in said copending application Serial No. 348,217 provide additional valving means in the conduit from the crankcase to the intake manifold which will close in the event of engine backfire to prevent the backfire flame from passing through the conduit into the crankcase and possibly causing an explosion in the crankcase, and also to close the ventilating conduit during cold weather starts.

However, it has been found in practice that it is difficult to provide sufficient control by valving means alone in the ventilating conduit between the crankcase and intake manifold to prevent the upset of proper carburetion due to the passage of too much air or blowby gases or both through the conduit during some conditions of engine operation, and to assure that the engine will not suffer damage because of dirt drawn in through the crankcase seals or because of direct damage to the seals from too much vacuum being applied to the crankcase. Accordingly, it is an object of the present invention to provide a system for crankcase ventilation wherein a valved conduit is provided between the crankcase and the intake manifold wherein additional means is provided in communication with the crankcase defining restricted communication between the inside of the crankcase and the atmosphere outside, allowing the restricted flow of atmospheric air into the crankcase to prevent the build-up of excessive and possibly damaging vacuum in the crankcase, while at the time cooperating with the valve means to prevent excessive flow of gases into the intake system which might disturb normal carburetor operation under some modes of vehicle operation.

Another object of the present invention is to provide a crankcase ventilating system of the general character described wherein the by-pass conduit means is established between the engine crankcase and the intake manifold by structure insuring isolation of the by-pass conduit from the atmosphere, thereby insuring predictable operation in response to the pressure conditions within the system.

A further object of the invention is to provide a crankcase ventilating system of the character described employing a by-pass conduit from the crankcase to the engine intake manifold, wherein valving means in the conduit is modulated in part by intake manifold vacuum, and in part by the pressure condition within the crankcase, and wherein variations in the vacuum at different points within the intake manifold at any given time are compensated for by providing a plurality of communications between the valving means and the intake manifold and thereby modulating the valve in response to an average intake manifold vacuum.

A still further object of the invention is to provide a novel crankcase ventilating system which is equally suitable for application to new or used automotive vehicles, and which can be installed by an ordinary mechanic without any particular skill being required, and without requiring the removal of any major engine parts such as the intake manifold valve rocker arm cover or the like.

Further objects and advantages of the present invention will appear during the course of the following part of the specification, wherein the details of construction and mode of operation of a preferred embodiment are described with reference to the accompanying drawings, in which:

FIGURE 1 is a top plan view showing an internal combustion engine embodying the present invention in a typical installation.

FIGURE 2 is an elevation view showing the crankcase ventilating apparatus of the present invention, with the associated internal combustion engine graphically represented in phantom.

FIGURE 3 is a vertical section taken on the line 3—3 in FIGURE 1, illustrating the oil filler cap forming a part of the present invention.

FIGURE 4 is a vertical section, partly in elevation, taken on the line 4—4 in FIGURE 1 but on a larger scale than in FIGURE 1, illustrating details of the system, and in particular the manner in which the by-pass structure is connected to the intake manifold and to the engine rocker arm cover.

FIGURE 5 is an axial section through the by-pass valve means of the system shown in FIGURES 1 to 4, including both a flow regulator portion and a flame arrestor-cold start control portion, FIGURE 5 also showing some details of the mounting for the valve means on the engine valve cover.

FIGURE 6 is a cross-sectional view taken on the line 6—6 in FIGURE 5, illustrating further internal details of the valve means, and particularly of the flame arrestor-cold start control portion thereof.

FIGURE 7 is an exploded view illustrating the fire check plate and seal diaphragm components of the flame arrestor-cold start control means shown in FIGURES 5 and 6.

FIGURE 8 is a sectional view taken on the line 8—8 in FIGURE 4, this view showing the grommet mounting for the valve means on the rocker arm cover of the engine.

FIGURE 9 is an axial section illustrating the grommet before installation in the pierced hole in the rocker arm cover.

FIGURE 10 is an elevational view, partly in section, illustrating the manner in which the road draft tube is plugged by a resilient, fir tree type plug.

FIGURE 11 is an elevational view illustrating the fir tree type resilient plug before it is engaged in the road draft tube.

Referring to the drawings, and at first particularly to FIGURES 1 and 2 thereof, the invention has been illustrated in combination with a conventional internal combustion engine 10 of the overhead valve, V-8 type. The engine has a crankcase 12 at the bottom thereof, and a pair of valve rocker arm covers 14 generally at the top of the engine, these usually being sheet metal stampings in production engines. The inside of the crankcase 12 communicates within the engine with the inside of the valve rocker arm covers 14, so that crankcase ventilation can be accomplished by attachment of one end of the ventilating apparatus to one or both of the valve rocker arm covers 14. This attachment can be to the valve side cover in the case of engines of the side valve type.

The engine 10 has an oil filler tube 16 extending upwardly therefrom, which is covered by a removable oil filler cap 18 of special construction having a restricted air flow orifice therein, cap 18 being described in detail hereinafter.

Conventional engines of the type shown usually embody a road draft tube 20 having a free end which is directed generally downwardly and to the rear and which is connected to the engine at 22 so as to communicate with the crankcase. The normal function of road draft tube 20 is to ventilate the crankcase, the rapid flow of air past the open free end of the road draft tube during vehicle operation causing a reduced pressure which will normally help draw the blowby gases out of the crankcase and vent them directly to the atmosphere. According to the present invention the free end of the road draft tube is completely blocked off by a special resilient fir tree type plug to be described in detail hereinafter.

The engine intake manifold 24 is disposed generally at the top, central portion of the engine, and in the conventional V-8 engine of the type shown in the intake manifold 24 has conduit portions 26 and 28 on opposite sides of the carburetor 30 which is connected to the intake manifold 24. The intake manifold is usually a substantially rigid, thick metal casting.

Referring still to FIGURES 1 and 2, the conduit means which is added to the engine according to the present invention for diverting the flow of blowby gases from the crankcase to the intake manifold is generally designated by the reference numeral 32. This conduit means 32 is actually connected between one of the valve rocker arm covers 14 (which would be the side cover for a side valve type engine) and the intake manifold 24, and part of the over-all conduit means from the crankcase to the intake manifold is internal passage means within the engine that is not shown in detail herein between the crankcase 12 and the rocker arm cover 14.

The conduit means 32 which is added to the engine according to the present invention includes valve means 33 having a flow regulator portion 34 and a flame arrestor-cold start portion 36, which portions are both embodied within a common casing 38 having a stem 40 which is connected to the valve rocker arm cover 14 by means hereinafter described in detail. The valve casing 38 also has a nipple 41 projecting therefrom for the attachment of hose means extending to the intake manifold for connection thereto by a suitable fitting or fittings. In many engines the intake manifold vacuum will vary at different points in the intake manifold at any particular time, and accordingly, in order to connect the valve means 33 to the intake manifold in such a way that the valve means will be responsive to a representative or average intake manifold vacuum, it is preferred to divide the portion of the conduit means 32 from the valve to the intake manifold into a plurality of sections. In the case of the V-8 type engine shown in the drawings, it is preferred to connect the valve means to the intake manifold at the two intake manifold portions 26 and 28 on opposite sides of the carburetor 30. This is preferably accomplished by connecting a short hose section 42 to the valve nipple 41, connecting one leg of a distribution "T" fitting 44 to this short hose section 42, connecting a pair of relatively long hose sections 46 to the other two legs of the "T" fitting, and then connecting the free ends of the hose sections 46 to the intake manifold portions 26 and 28 by suitable fittings 48 which are preferably special elbow fittings described in detail hereinafter.

An important part of the present combination is the special oil filler cap 18 which replaces the conventional oil filler cap and is removably engaged over the end of the oil filler tube 16. Cap 18 provides a restricted flow orifice for admitting atmospheric air into the crankcase at a controlled, restricted rate. Without this restricted orifice, if the filler cap were to completely close off the oil filler tube, there is a likelihood that an undesirably high vacuum might be applied to the crankcase under some conditions of engine operation, which could draw dirt into the crankcase through the crankcase seals and thereby damage the engine, or could directly injure the crankcase seals because of the relatively high pressure differential thereon. On the other hand, if the oil filler cap were to permit too much air to flow therethrough into the crankcase, which would normally be the case without the special restricted-orifice type of filler cap provided herein, then relatively large amounts of air would be drawn into the crankcase and thence through the ventilating bypass conduit means into the intake manifold, which would interfer with the proper operation of flow regulator 34 partly in response to manifold pressure, and interfere with carburetion.

The oil filler cap 18 includes an outer metal shell 50, an inner, cup-shaped shell 52 secured at its top-central region to the outer shell 50, and a metal sleeve 54 secured to and extending downwardly from the inner shell 52 and disposed concentrically within a generally cylindrical skirt portion of the outer shell 50. A ring 56 of filtering material is disposed between the sleeve 54 and the skirt on the outer shell 50, and may be composed of any suitable porous filtering material, as for example a fibrous material or porous foam plastic material. An orifice 58 is provided in the wall of inner shell 52, permitting the entry of atmospheric air into the oil filler tube 16 by passing in the direction of the arrows in FIGURE 3, first through the filtering material 56 and then through the orifice 58 into the interior of inner shell 52 and sleeve 54, and thus into tube 16.

The orifice 58 provides sufficient ventilation of atmospheric air into the crankcase to prevent excessive crankcase vacuum which might otherwise be transmitted from the intake manifold under certain conditions of engine operation, thereby preventing dirt from being sucked in through the crankcase seals and preventing the crankcase seals from being directly damaged by the pressure differential. On the other hand, the orifice 58 sufficiently restricts the flow of the atmospheric air into the crankcase to prevent an unduly large flow of air from the crankcase through the ventilating conduit means into the intake manifold which might upset the proper carburetor balance. Also, if too much air is admitted into the crankcase from the atmosphere, then the ability of the flow regulator portion 34 of the valve means 33 to properly modulate the by-pass flow in response to the volume of blowby gases will be diminished or defeated by the presence of the large amount of added atmospheric air. Thus, the special oil filler cap 18 having the restrictive air flow orifice 58 therein cooperates with the valve means in the by-pass conduit for proper flow control in the by-pass conduit under various conditions of engine operation. An orifice diameter on the order of about 3/16 of an inch has been found suitable in most instances, although it is to be understood that the invention is not limited to this particular orifice diameter.

A further element required for controlling the restricted air flow into the crankcase as described hereinabove in connection with the oil filler cap 18 is the resilient fir tree type plug 62 employed to seal off the free end of the road draft tube 20. If the road draft tube 20 were left open, it would provide different effects upon the crankcase ventilation for different conditions of engine and vehicle operation, all of which would tend to defeat the carefully controlled admission of atmospheric air into the crankcase and by-passing of gases from the crankcase to the intake manifold as regulated by the valve means 33. For example, when the vehicle is stationary or moving at slow speed, the road draft tube 20 permits relatively free flow of atmospheric air into the crank case, which can upset carburetor balance in the same manner as free flow through the oil filler tube. On the other hand, when the vehicle is moving at relatively high speeds, a substantial vacuum condition is applied to the road draft tube by the rapid flow of air past the open, generally rearwardly facing end of the tube, which opposes the vacuum condition applied by the intake manifold through the conduit means 32, and works against the whole purpose of the present invention. Additionally, this vacuum condition applied by the road draft tube 20 is a variable and generally indeterminate factor, and prevents any accurate control over crankcase ventilation back to the engine intake system. Accordingly, the resilient fir tree type plug is an important element of the present invention.

The plug 62 is shown apart from the troad draft tube in FIGURE 11, and during installation into the road draft tube in FIGURE 10. The over-all shape of the plug 62 is generally frusto-conical, with a series of annular serrations 64 being provided between the respective front and rear ends 66 and 68 of the plug. Each of these serrations has a generally frusto-conical forward surface 70 and a generally flat, annular rearward surface 72. In this manner, the resilient plug 62 is adapted to be pushed into tight, sealing engagement within the open lower end 74 of a road draft tube having any diameter generally intermediate between the diameters of the front and rear ends 66 and 68 of the plug, and regardless of the particular shape or cut-off angle of the open lower end 74 of the road draft tube. The forwardly facing frusto-conical surfaces 70 of the serrations assist in leading the plug into the open end of the road draft tube, and the serrations function as cogs against the removal of the plug.

When the resilient plug 62 has been forced into a fully seated position within the open end of the road draft tube as shown in FIGURE 10, it is preferred to slice the plug 66 off flush with the open lower end 74 of the tube so that none of the plug projects out of the open end of the tube and the plug cannot be dislodged by bumping against anything.

FIGURE 4 shows details of one of the elbow fittings 48 employed for connection of the conduit means 32 with the intake manifold 24. The elbow fitting 48 is a drivable, frictionally engageable fitting which can be connected in sealed engagement with the intake manifold by merely boring a hole through the wall of the manifold and driving the fitting 48 into position, without requiring any tapping of threads in the bore in the intake manifold and without requiring that the fitting be screwed into place. Thus, this preferred elbow fitting 48 has particular utility in connection with used car installations, but also facilitates new car installations. Additionally, the tight interference fit established between the elbow fitting 48 and the wall of the bore in the intake manifold wall insures a sealed connection, and there is no likelihood of leakage developing as can occur if a threaded connection becomes loosened.

This elbow fitting is disclosed in the copending application of Frederick M. Arnold, Serial No. 323,964, filed November 15, 1963 for "Drivable Elbow."

The drivable elbow 48 has a first tubular leg portion 76 which is the drivable leg, this portion having an open free end 78, with a reduced neck 80 proximate the free end 78. Preferably, this end is beveled at 82 to facilitate entry into the bore in the intake manifold wall. The other end of the first leg 76 is formed with a relatively thick, solid driving head 86 which projects somewhat above a second tubular leg 88 which is the coupling leg. Leg 88 extends generally at right angles from the first leg 76 and terminates at an open, free end 90 having an external gripping rib 92 thereon for sealed engagement with the hose section 46. Internal communication is provided between the tubular leg portions 76 and 88 of the elbow 48. The reduced neck portion 80 is driven into a frictional, interference fit with the wall of a bore 94 extending through the wall of the intake manifold by applying driving blows against the driving head 86 by a hammer or other suitable impacting tool.

It is to be noted that the intake manifold 24 which is bored to receive the elbow fittings 48 is a relatively thick and generally rigid casting. On the other hand, the valve rocker arm cover 14 to which the stem 40 of valve means 33 is attached is generally fabricated of sheet metal which is considerably thinner and is formable. This factor, and also the nature of the valve means 33, result in quite a different problem for attaching the valve stem 40 to the rocker arm cover 14, while at the same time providing a good seal and a strong physical connection for this mounting.

The preferred means for attaching the valve stem 40 to the rocker arm cover 14 is the grommet mounting shown in FIGURES 4, 5, 8 and 9. This grommet mounting is disclosed in the copending application of Keith R. Dickau, Serial No. 349,988, filed March 6, 1964 for "Grommet Mounting and Method and Apparatus for Preparing Same."

The grommet mounting embodied in the present invention includes two principal elements, a special pierced hole providing a passage 96 through the rocker arm cover 14 which has at least three sides and preferably is square in cross-section. The hole is formed by piercing the rocker arm cover from the outside by an elongated tool having a square cross-section and a pyramidal head, to provide four generally equal tangs 98 which would be triangular if flat, but which curl inwardly from the surrounding surface of the rocker arm cover 14 so that their apexes 100 point away from the passage 96. By this means the passage 96 has considerable axial depth and has rounded surfaces, and is thus suited to receive a grommet 102 of elastomeric material. The grommet 102 has a generally flat, disc-shaped head 104, with a body 106 extending from one of the flat sides of head 104 and having a generally square cross-section. Thus, the body 106 has four sides 108, and these sides are somewhat undercut so that the cross-section of the body is smaller adjacent the head than at its free end 110. A passage 112 extends through the grommet to receive the valve stem 40, the stem 40 having a barb 114 at its free end for engagement against the free end 110 of the grommet.

The dimensions of the square passage 96, the square body 106 of the grommet and the valve stem 40 are such that when the grommet and valve stem are pushed into the passage 96 the grommet will be under considerable compression and will be formed to provide an excellent sealed connection between the valve stem 40 and the rocker arm cover 14 so as to provide communication between the inside of the cover 14 and the valve means 33. The undercut configuration of the sides of the grommet body locks the grommet into its operative position, drawing the resilient head 104 of the grommet into tightly sealed engagement with the surface of the rocker arm cover 14 immediately surrounding the passage 96 in the cover.

Reference will now be made to FIGURES 5, 6 and 7, which show the valve means 33 in detail. Valve means 33 includes the casing 38 which comprises a body 116 and a cap 118 peripherally clamped to the body. Formed as a part of the body 116 is a flow regulator outlet nozzle 120 having an inner end opening 122 which provides a valve seat for the flow regulator portion of the valve means 33. A flexible diaphragm 124 is peripherally clamped between the body 116 and the cap 118 so as to divide the space within the casing into a pair of chambers 126 and 128, the chamber 126 being on the body side of the diaphragm and the chamber 128 being on the cap side.

A diaphragm plate 130 seats against diaphragm 124, and has a central bulge 132 which is adapted to seat in the nozzle opening 122 in the closed position of the flow regulator. The bulge 132 has a bleed slot 134 therein to permit a small amount of gas flow through the flow regulator even in such closed position. Regulator spring 136 is engaged at one end against the body 116, being positioned over the outlet nozzle 120, and is engaged at its other end against the diaphragm plate 130, the spring 136 holding plate 130 against diaphragm 124 and biasing the diaphragm and plate away from the nozzle opening 122 so that the position of repose of the flow regulator is the open position. The spring 136 engages the diaphragm plate proximate the annular junction between the bulge 132 and the flat part of the plate, so that the spring 136 tends to center the bulge 132 with respect to the nozzle opening 122. Otherwise, the plate 130 is free-floating with respect to diaphragm 124, so that the plate bulge 132 has a self-centering action as it moves into the closed position in the nozzle opening 122. By this means, proper closure of the flow regulator is assured despite irregularities which might occur from manufacturing tolerances or some physical damage to the valve, thus assuring relatively accurate control of the exhaust gas flow through the regulator.

The crankcase 12 communicates with the flow regulator chamber 126 through the rocker arm cover 14, the valve stem 40, and valve inlet port 138 at the inner end of stem 40.

An atmosphere vent hole 140 is provided in cap 118 so that chamber 128 is at atmospheric pressure.

The spring 136 is a relatively light spring which is adapted to keep the flow regulator nozzle open for outlet gas pressures (i.e. intake manifold negative pressures) equal to and more positive than a pre-selected outlet gas pressure. Thus, the spring has a force substantially equal to the desired flow regulator opening pressure times the effective diaphragm plate area opposite the nozzle opening 122.

The pre-elected pressure to be maintained at the flow regulator inlet port 138, and hence in the crankcase chamber itself, is a negative pressure sufficient to draw all of the blowby gases out of the crankcase, yet which is not so negative that too much air will be drawn in through the crankcase, or to cause a tendency to draw dirt in through the crankcase seals. While there is a sufficiently strong vacuum in the intake manifold to draw such blowby gases from the crankcase if a simple open tube connection were made from the manifold to the crankcase, such a procedure is not practical because the high manifold vacuums at low speeds and during deceleration are too high to be transmitted directly to the crankcase. The flow regulator portion 34 of the valve means 33, which portion is best shown in FIGURE 5, provides controlled flow of gases from the crankcase to the intake manifold which closely matches the flow volume of blowby gases into the manifold under most conditions of engine operation.

The operation of the flow regulator 34 is generally as follows: The intake manifold vacuum is transmitted to the regulator through the nozzle 120 with its open end 122 inside the chamber 126, the negative pressure varying from about 20 inches of mercury to less than about 1 inch of mercury. This varying intake manifold negative pressure acts directly upon the central bulge 132 of the diaphragm plate, on an area about equal to the cross-sectional area of the nozzle opening 122, tending to pull the diaphragm and diaphragm plate against the open end of the nozzle to shut the regulator. The spring 136 functions to push the diaphragm plate and diaphragm away from the open end of the nozzle when the blowby rate increases so that the increased gas flow may pass into the nozzle.

The spring 136 forces the diaphragm plate and diaphragm away from the nozzle opening when the intake manifold vacuum tending to close the regulator becomes weaker than the force of the spring tending to open the regulator. The spring is selected so as to have a regulator opening force substantially equal to the force of a selected intake manifold negative pressure, as for example about 16 or 15 inches of mercury. The diaphragm will, therefore, be drawn against the open end of the regulator nozzle at high manifold vacuums, as for example 20 to 16 inches of mercury. The blowby flow rate at these high manifold vacuums is low and the small amount of blowby gases is drawn into the regulator nozzle opening through various linkage points, or by the limited access port formed by the bleed slot 134. When the intake manifold vacuums become weaker, or more positive, as for example 16 or 15 inches negative pressure, the force of the spring pushes the diaphragm plate and diaphragm away from the nozzle opening, providing a larger gas passage to the nozzle. The blowby gas flow rate is beginning the increase at these manifold pressures, and the gases are able to easily flow into the regulator nozzle opening because of the large access area. The now increasingly absolute, or more positive, pressures in the crankcase provide a lifting force against the diaphragm tending to push the diaphragm and diaphragm plate further away from the nozzle opening, making an even greater access passage.

There is always a slight negative pressure in the crankcase. At high intake manifold vacuums, the direct manifold action drawing the diaphragm plate and diaphragm down against the nozzle will be assisted by the weaker negative pressure in the crankcase, which will also tend to keep the valve shut by pulling on the larger area of the diaphragm which is radially outwardly disposed relative to the nozzle. However, as the intake manifold vacuum becomes weaker, the crankcase vacuum likewise becomes weaker; and once the spring has opened the regulator the crankcase vacuums will become increasingly weaker, tending to allow the spring to push the diaphragm even further away. In this regard, it is to be noted that the terms used herein stating that negative pressures or vacuums become weaker, or more absolute or more positive, means that the pressure is approaching atmospheric pressure.

The crankcase pressures exert only a small diaphragm lifting pressure, but they exert their force on a much larger area of the diaphragm than the intake manifold pressures. These crankcase pressures exert their force over an annular portion of the diaphragm extending from the diaphragm flexure or bending line in to about the circular area of the bulge of the diaphragm plate adjacent the open end of the nozzle. The diaphragm lifting action of the increasingly more absolute crankcase pressures on the larger area of the diaphragm increasingly releases the spring biasing force on the diaphragm plate and the spring pushes the diaphragm plate away from the nozzle providing a maximum size passage for unrestricted flow into the nozzle, and this condition is the condition of engine operation which provides high blowby flow rates.

As the engine speed or workload increases, the blowby flow rate will increase, and at the same time the intake manifold vacuum will decrease. Conversely, as the engine speed or workload decreases, the blowby flow rate decreases, while at the same time the intake manifold vacuum tends to increase. As seen from the above description of the operation of the flow regulator 34, the regulator tends to be closed by increased manifold vacuums, and tends to be opened by increased flow rates of blowby gases into the crankcase, which tends to increase crankcase pressure, whereby the combined effects tend to modulate the valve so as to accommodate the flow of blowby gases at various engine operating conditions without normally tending to apply too much vacuum to the crankcase, and without normally tending to apply too much air from the crankcase to the intake manifold so as to interfere with proper carburetion.

However, optimum responsiveness of the flow regulator 34 to both intake manifold and crankcase pressure conditions also reqires restricted crankcase ventilation to the atmosphere and air-tight sealed connections of the blowby conduit means 32 to both the intake manifold and the valve rocker arm cover. These sealed connections are provided by means described hereinabove in detail, including the drivable elbow fittings 48 and the grommet mounting 102 for the valve stem 40. The restricted air flow communication between the crankcase and the atmosphere is, as set forth hereinabove, provided by the special restricted flow valve filler cap 18 and the fir tree type resilient plug 62 engaged in the open lower end 74 of the road draft tube 20. If an unrestricted air flow passage were permitted into the crankcase, then the flow regulator diaphragm 124 would not be responsive to increased blowby flow rates as set forth hereinabove, and the regulator would therefore not contribute its share in the modulation of the diaphragm 124 for controlling the recirculation of blowby gases to the intake manifold. Also, the pressure would tend to be higher in the crankcase, which would tend to raise the diaphragm 124 and plate 130 further from the nozzle opening 122, and under some conditions of engine operation too much air would pass through the conduit means 32 into the intake manifold and carburetion would be seriously disturbed.

On the other hand, if the crankcase were completely sealed, then under some conditions of engine operation the transmission of high intake manifold vacuums to the crankcase could cause a high vacuum build-up in the crankcase (such as during extended deceleration or idle when blowby is at a minimum and intake manifold vacuum is high). Such excessive crankcase vacuums are likely to cause engine damage by crankcase seal failure or by drawing dirt into the crankcase.

The position of repose of the flow regulator 34 is its fully open position, which is the position of the regulator when the engine is not operating. It will be apparent that when the engine is being cranked for starting, at which time it is revolving at only about 50 to 150 r.p.m., the intake manifold vacuum will not be sufficient to substantially close the flow regulator, and it will be at or near its fully open position, during which condition the flow regulator provides practically a wide open communication between the crankcase and the intake manifold. However, such wide open communication destroys the effectiveness of the choke valve for cold start conditions, breaking the intake manifold vacuum, and provides added air so that the mixture is too lean for proper starting. Thus, it is important for proper cold starting to provide additional flow control means in the conduit means 32 which will be substantially closed during cold start conditions to compensate for the substantially wide open condition of the flow regulator 34, and this additional means is provided by the flame arrestor portion 36 of the valve means 33.

Another circumstance in which it is important to close the conduit between the crankcase and the intake manifold is whenever there is a backfire (i.e. inadvertent ignition of the fuel-air mixture in the carburetor-intake manifold system). This latter circumstance is most dangerous whenever there is a tendency for raw gasoline or gasoline fumes to concentrate in the crankcase, which tends to occur during cold starting conditions and also frequently when the engine has been operating, is turned off, and is again turned on while it is still hot. The flame arrestor 36 automatically blocks the conduit means 32 whenever there is such a backfire, regardless of how open the flow regulator 34 might be at that particular engine operating condition. The body 116 of the casing for the valve means 33 is provided with an extension 142 for housing the flame arrestor. Extension 142 has an annular shoulder 144, beyond which the extension terminates in an annular lip 146.

Seated against the shoulder 144 and disposed within lip 146 is a fire check plate 148, which may be composed of sheet metal or other suitable material, and which has a plurality of apertures 150 therethrough. Although three of the apertures 150 can be employed, preferably there are four apertures 150, and these are regularly spaced about plate 148 at approximately the same radial distance from the center of the plate. The fire check plate 148 is preferably bowed or dished somewhat in the downstream direction for the purpose hereinafter described.

Immediately downstream of the fire check plate 148 is fire check seal diaphragm 152 comprising a relatively thin, flat sheet of material which is resilient and flexible and which has good memory characteristics, preferably but not necessarily an elastomer material. Diaphragm 152 has substantially the same diameter as the check plate 148, and is provided with a plurality of slits 154, the number of which depends upon the number of apertures 150 in the fire check plate. Thus, in the embodiment illustrated, a pair of the slits 154 are provided, crossing each other at right angles, with small circular holes 156 at the ends of the slits to prevent tearing. The slits 154 thus provide a plurality of generally triangular flaps 158, these being four in number in the embodiment shown in the drawings. The seal diaphragm 152 is rotationally oriented with respect to fire check plate 148 so that each of the flaps 158 registers with a respective aperture 150. In this manner, when the seal diaphragm 152 is in its position of repose, generally as shown in FIGURE 7, the flaps 158 will completely close off the respective apertures 150. Since the seal diaphragm 152 is a flat sheet of resilient material in its completely relaxed position, as shown in FIGURE 7, the bowed or dished-shape of fire check plate 148 will apply a downstream deflection to each of the four flaps 158, which results in each of the flaps being biased to its closed position over its respective aperture due to the resiliency of the diaphragm material.

The flame arrestor structure is completed by a closure 160 which has an outwardly directed annular flange 162 that fits into the body extension lip 146, the lip 146 being turned inwardly to compress the flange 162 against the periphery of diaphragm 152 so as to peripherally seal the diaphragm and check plate within the extension 142. Closure 160 has the tubular nipple 41 formed thereon, the nipple 41 extending downstream and connecting with the hose section 22 for connection to the intake manifold as hereinabove described. The closure 160 may also include a shoulder 164 facing upstream which limits the amount of flexing of the diaphragm flaps 158 to minimize wear of the flaps.

Under normal engine operating conditions the diaphragm flaps 158 are highly flexible, and they will not substantially impede the free flow of flowby gases passing from the crankcase and through the flow regulator 34 to the intake manifold. The flaps will merely flex in a downstream direction as shown in FIGURES 5 and 6 so that the blowby exhaust gases will flow through the apertures 150 without substantial resistance from the flaps 158.

However, in the event of a backfire, the sudden increase of intake manifold pressure with respect to crankcase pressure causes a reverse rush of gases which will instantaneously close the flaps over their respective apertures to prevent the flame front from passing through the flame arrestor 36 and into the crankcase, where raw gasoline or gasoline fumes might be ignited. At this time the fire check plate functions as a valve seat against which the diaphragm flaps rest. As the backfire subsides and the normal direction of flow is resumed, the flaps will again automatically open.

Control of the flow of gases from the crankcase to the intake manifold during cold start conditions is achieved in the flame arrestor 36 by employing a resilient, flexible material in the seal diaphragm 152 which becomes stiff or substantially rigid when it is cold, so that when the engine is cold the diaphragm flaps will be frozen in their closed positions and will prevent any substantial flow of air or other gases from the crankcase to the intake manifold. It is desirable that the material of diaphragm 152 stiffen or freeze up at temperatures below about 70° F., and it is particularly important at sub-zero temperatures. Although any sufficiently durable material having these characteristics may be employed, one such material which has been found satisfactory is the synthetic rubber product "Viton" produced by DuPont, which stiffens and loses its flexibility at about 20° F. and lower, but which is quite flexible at higher temperatures.

When the engine is turned off after operation it will be hot and the diaphragm 152 will be flexible, so that the diaphragm will automatically move to its closed position, which is thus the position in which the diaphragm stiffens when the engine becomes cold. Accordingly, when the engine is cold the diaphragm flaps will remain substantially closed to prevent any substantial flow of air or other gaseous materials from the crankcase into the intake manifold which might otherwise disturb the rather sensitive carburetion balance under cold starting conditions. However, long before the engine reaches normal operating temperature of about 200° F. the diaphragm will become highly flexible and the flaps will be permitted to open to accommodate the passage of blowby gases.

The restricted flow oil filler cap 18 and road draft tube plug 62, will provide adequate limitation of the amount of added ventilating air allowed to enter the crankcase, and with the modulation of regulator 34 this added air will not materially disturb carburetion under all conditions when the engine is in normal operation. However, during cold engine starting the carburetion is generally so critical that even this small amount of air flow into the crankcase may upset conditions so as to make starting difficult, and accordingly the cold start control provided by flame arrestor 36 will take care of this one condition when the limited flow filler cap and road draft tube plug, in combination with the flow regulator 34, will not be adequate.

While the instant invention has been shown and described herein in what are conceived to be the most practical and preferred embodiments, it is recognized that departures may be made therefrom within the scope of the invention, which is therefore not to be limited to the details disclosed herein, but is to be accorded the full scope of the claims.

What we claim is:

1. In an internal combustion engine having a crankcase with an oil filler tube extending therefrom and having an intake manifold, the combination with said engine of a crankcase ventilating system comprising by-pass conduit means from the crankcase to the intake manifold, the intake manifold having a vacuum condition therein causing blowby gases to flow from the crankcase to the intake manifold, valve means in said by-pass conduit means, said valve means modulating the passage of gases from the crankcase to the intake manifold, said valve means being responsive to intake manifold vacuum for increased restriction of said conduit means upon increased intake manifold vacuum and being responsive to the flow of blowby gases into the crankcase for decreased restriction of said conduit means upon increased blowby gas volume, sealing means associated with the crankcase for limiting communication between the crankcase and the atmosphere to communication through the oil filler tube, and an oil filler cap removably engaged over the open end of said oil filler tube and having an orifice therein admitting a restricted flow of atmospheric air into the crankcase through the oil filler tube, said orifice restricting the flow of air into the crankcase sufficiently to allow the intake manifold vacuum to establish a slight vacuum condition in the crankcase through said by-pass conduit means, and restricting the flow of air into the crankcase sufficiently so that this flow of air will not interfere with modulation of said valve means in response to blowby gas volume into the crankcase and will not interfere with carburetion of the engine, but said flow of air preventing full intake manifold vacuum from being transmitted to the crankcase, said valve means comprising a casing, a flexible diaphragm within the casing dividing the casing into a first chamber and a second chamber, a gas inlet into said first chamber and having an engine crankcase connector, a gas outlet from said first chamber and having an engine intake manifold connector, a valve nozzle inside the first chamber, one end of said nozzle communicating with the gas outlet and the other end of the nozzle terminating in an open end adjacent said diaphragm which is at least partially blocked to the passage of gases therethrough by the diaphragm when the diaphragm is drawn toward said open end by intake manifold vacuum in the nozzle, and a spring in said first chamber between the casing wall and the diaphragm, the spring biasing the diaphragm away from the open end of the nozzle to keep open said open end for intake manifold vacuums less than a preselected vacuum.

2. Apparatus as defined in claim 1, wherein said valve means further includes a flame arrestor in said intake manifold connector, said flame arrestor including housing means having a passage therethrough forming a part of said intake manifold connector, a valve seat proximate said passage in said housing and facing downstream for the normal direction of gas flow from the crankcase to the intake manifold, a valve element in said housing of the downstream side of said seat, said valve element being held by the flow of gases in an open position spaced downstream of said valve seat during normal engine operation when the intake manifold is at a substantially lower pressure than the crankcase to permit the substantially unimpeded flow of blowby exhaust gases past the valve element, and the valve element being movable to a closed position against said seat to block the flame front from the crankcase upon a pressure reversal resulting from backfiring in the engine fuel intake system.

3. Apparatus as defined in claim 2, which includes means lightly biasing said valve element toward its said seat, whereby the position of repose of said element when the engine is inoperative and there is no pressure differential between the crankcase and the intake manifold is the closed position of the element against the seat, said biasing means exerting a biasing force which is sufficiently light so that during normal engine operation said element will not substantially impede the flow of blowby exhaust gases from the crankcase to the intake manifold.

References Cited by the Examiner
UNITED STATES PATENTS

| | | | |
|---|---|---|---|
| 3,145,697 | 8/1964 | Barr | 123—119 |
| 3,158,142 | 11/1964 | Bradshaw | 123—119 |
| 3,172,399 | 3/1965 | Lentz | 123—119 |

KARL J. ALBRECHT, *Primary Examiner.*